(12) United States Patent
Govindan et al.

(10) Patent No.: US 12,255,750 B2
(45) Date of Patent: Mar. 18, 2025

(54) OPTIMIZED INTRA-VLAN MULTICAST FORWARDING FOR SOFTWARE-DEFINED ACCESS ARCHITECTURES

(71) Applicant: Cisco Technology, Inc., San Jose, CA (US)

(72) Inventors: Vengada Prasad Govindan, Chennai (IN); Aswin Kuppusami, Chennai (IN)

(73) Assignee: Cisco Technology, Inc., San Jose, CA (US)

( * ) Notice: Subject to any disclaimer, the term of this patent is extended or adjusted under 35 U.S.C. 154(b) by 112 days.

(21) Appl. No.: 18/328,918

(22) Filed: Jun. 5, 2023

(65) Prior Publication Data

US 2024/0406021 A1 Dec. 5, 2024

(51) Int. Cl.
*G06F 15/173* (2006.01)
*H04L 12/18* (2006.01)
*H04L 12/44* (2006.01)

(52) U.S. Cl.
CPC ........ *H04L 12/1886* (2013.01); *H04L 12/185* (2013.01); *H04L 12/44* (2013.01)

(58) Field of Classification Search
CPC .... H04L 12/1886; H04L 12/185; H04L 12/44
USPC ......................................................... 709/238
See application file for complete search history.

(56) References Cited

U.S. PATENT DOCUMENTS

| | | | |
|---|---|---|---|
| 7,512,146 B1 | 3/2009 | Sivasankaran et al. | |
| 7,899,928 B1 | 3/2011 | Naik et al. | |
| 9,294,393 B1 * | 3/2016 | Mullooly | H04L 41/122 |
| 9,584,399 B2 * | 2/2017 | Wang | H04L 45/12 |
| 10,142,163 B2 * | 11/2018 | Govindan | H04L 41/0654 |
| 10,454,877 B2 * | 10/2019 | Fernando | H04L 41/40 |
| 10,516,549 B2 * | 12/2019 | Shen | H04L 45/7453 |
| 10,536,367 B2 * | 1/2020 | Pignataro | H04L 45/50 |
| 10,623,207 B2 * | 4/2020 | Narayanan | H04L 12/1886 |
| 10,805,145 B2 * | 10/2020 | Govindan | H04L 41/0654 |
| 11,115,375 B2 * | 9/2021 | Fernando | H04L 41/12 |
| 11,218,336 B2 * | 1/2022 | Narayanan | H04L 12/1886 |
| 11,233,667 B2 * | 1/2022 | Govindan | H04L 41/5019 |
| 11,258,621 B2 * | 2/2022 | Karmarkar | H04L 12/1845 |
| 11,290,302 B2 * | 3/2022 | Thubert | H04L 45/02 |
| 11,349,891 B1 * | 5/2022 | Mishra | H04L 65/60 |
| 11,394,571 B2 * | 7/2022 | Homma | H04L 12/4641 |
| 11,528,157 B1 * | 12/2022 | Patel | H04L 12/1886 |
| 11,570,097 B1 * | 1/2023 | Arumugam | H04L 45/04 |
| 11,689,449 B2 * | 6/2023 | Govindan | H04L 41/0663 370/217 |
| 11,736,393 B2 * | 8/2023 | Thubert | H04L 45/02 709/238 |
| 11,799,676 B2 * | 10/2023 | Govindan | H04L 45/16 |
| 11,870,605 B2 * | 1/2024 | Nalagatla | H04L 12/462 |

(Continued)

*Primary Examiner* — Alicia Baturay
(74) *Attorney, Agent, or Firm* — Polsinelli P.C.

(57) ABSTRACT

A multicast state is generated within a Layer 2 (L2) fabric through a set of L2 tunnel router devices within the L2 fabric. The multicast state is generated without forwarding multicast traffic through Layer 3 (L3) gateways. When a data packet is received for distribution to other devices in the L2 fabric, an underlay multicast tree is defined at an L2 tunnel router device that is to serve as the multicast source for the data packet in the L2 fabric. The data packet is streamed to the other devices through the L2 tunnel router device along the underlay multicast tree without forwarding the data packet through the L3 gateways.

20 Claims, 6 Drawing Sheets

(56) References Cited

U.S. PATENT DOCUMENTS

| | | | |
|---|---|---|---|
| 11,888,912 B1* | 1/2024 | Mishra | H04L 65/611 |
| 11,991,076 B1* | 5/2024 | Govindan | H04L 45/58 |
| 12,113,702 B1* | 10/2024 | Patel | H04L 45/44 |
| 12,126,532 B1* | 10/2024 | Patel | H04L 45/02 |
| 2012/0201246 A1 | 8/2012 | Gutierrez | |
| 2013/0021942 A1 | 1/2013 | Bacthu et al. | |
| 2014/0376366 A1* | 12/2014 | Li | H04L 12/185 |
| | | | 370/230 |
| 2015/0003450 A1 | 1/2015 | Salam et al. | |
| 2018/0041360 A1* | 2/2018 | Shen | H04L 12/1886 |
| 2019/0013966 A1 | 1/2019 | Nagarajan et al. | |
| 2024/0235890 A1* | 7/2024 | Nalagatla | H04L 12/1877 |

\* cited by examiner

OPTIMIZED INTRA-VLAN MULTICAST FORWARDING FOR SOFTWARE-DEFINED ACCESS ARCHITECTURES

TECHNICAL FIELD

The present disclosure generally relates to the field of computer networking, particularly with regard to the flooding of multicast data packets in the Layer 2 (L2) domain.

BACKGROUND

Software-Defined Access (SDA) network architectures have been implemented to provide improved network visibility while allowing segmentation of networks to isolate traffic, reduce risk, and contain any threats. Through these SDA network architectures, group-based access policies can be defined and applied to provide consistency in policy over entire enterprises. SDA network architectures are typically implemented by flooding multicast data packets in the L2 broadcast domain. However, this flooding of multicast data packets is performed without any optimizations for selective multicast inside the broadcast domain. This can be detrimental in environments that have large L2 forwarding domains, which can result in hosts (e.g., Internet-of-Things (IoT) devices, constrained devices, etc.) experiencing failures due to receiving large and/or high-rate multicast data packets. Relying on a Layer 3 (L3) gateway or multicast router of the L2 broadcast can play a critical role in forming the correct L2 multicast state across switches that have hosts in the L2 broadcast domain. However, relying on a L3 gateway or multicast route can result in a bottleneck for scalability and can cause inefficient forwarding depending on the physical network topology.

BRIEF DESCRIPTION OF THE FIGURES

To provide a more complete understanding of the present disclosure and features and advantages thereof, reference is made to the following description, taken in conjunction with the accompanying drawings, in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed herein are systems, methods and computer-readable storage media for forwarding intra-VLAN multicast traffic within an L2 fabric through L2 tunnel router devices within the L2 fabric without having to forward the intra-VLAN multicast traffic through L3 gateway devices.

In an example, a computer-implemented method comprises generating a multicast state within an L2 fabric. The multicast state is generated in a set of L2 tunnel router devices within the L2 fabric. Further, the multicast state is established without forwarding multicast traffic through L3 gateways. The computer-implemented method further comprises receiving a data packet. The data packet is received for distribution to other devices in the L2 fabric. The computer-implemented method further comprises defining an underlay multicast tree. The underlay multicast tree is defined at an L2 tunnel router device from the set of L2 tunnel router devices. Further, the L2 tunnel router device serves as a multicast source for the data packet. The computer-implemented method further comprises streaming the data packet to the other devices in the L2 fabric. The data packet is streamed through the L2 tunnel router device along the underlay multicast tree without forwarding the data packet through the L3 gateways.

In an example, the data packet is streamed as BUM traffic within the L2 fabric.

In an example, the computer-implemented method further comprises receiving a (S,G) Internet Group Management Protocol (IGMP) join request, wherein the (S,G) IGMP join request corresponds to a multicast source within the L2 fabric and processing the (S,G) IGMP join request within the L2 fabric without forwarding the (S,G) IGMP join request to the L3 gateways.

In an example, network traffic from sources outside of the L2 fabric are forwarded to the other devices in the L2 fabric through the L3 gateways.

In an example, the computer-implemented method further comprises transmitting periodic data packets within the L2 fabric without forwarding the period data packets through the L3 gateways. The periodic data packets indicate the multicast source.

In an example, the data packet is streamed to the other devices in the L2 fabric as a result of the data packet indicating a local Media Access Control (MAC) address corresponding to the multicast source.

In an example, the other devices include a set of constrained devices.

In an example, a system comprises one or more processors and memory storing thereon instructions that, as a result of being executed by the one or more processors, cause the system to generate a multicast state within an L2 fabric. As noted above, the multicast state is generated in a set of L2 tunnel router devices within the L2 fabric. Further, the multicast state is established without forwarding multicast traffic through L3 gateways. The instructions further cause the system to receive a data packet. The data packet is received for distribution to other devices in the L2 fabric. The instructions further cause the system to define an underlay multicast tree. The underlay multicast tree is defined at an L2 tunnel router device from the set of L2 tunnel router devices. Further, the L2 tunnel router device serves as a multicast source for the data packet. The instructions further cause the system to stream the data packet to the other devices in the L2 fabric. The data packet is streamed through the L2 tunnel router device along the underlay multicast tree without forwarding the data packet through the L3 gateways.

In an example, a non-transitory computer-readable storage medium stores thereon executable instructions that, as a result of being executed by one or more processors of a computer system, cause the computer system to generate a multicast state within an L2 fabric. As noted above, the multicast state is generated in a set of L2 tunnel router devices within the L2 fabric. Further, the multicast state is established without forwarding multicast traffic through L3 gateways. The executable instructions further cause the computer system to receive a data packet. The data packet is received for distribution to other devices in the L2 fabric. The executable instructions further cause the computer system to define an underlay multicast tree. The underlay multicast tree is defined at an L2 tunnel router device from the set of L2 tunnel router devices. Further, the L2 tunnel router device serves as a multicast source for the data packet. The executable instructions further cause the computer system to stream the data packet to the other devices in the L2 fabric. The data packet is streamed through the L2 tunnel router device along the underlay multicast tree without forwarding the data packet through the L3 gateways.

Description of Example Embodiments

Figure 5:
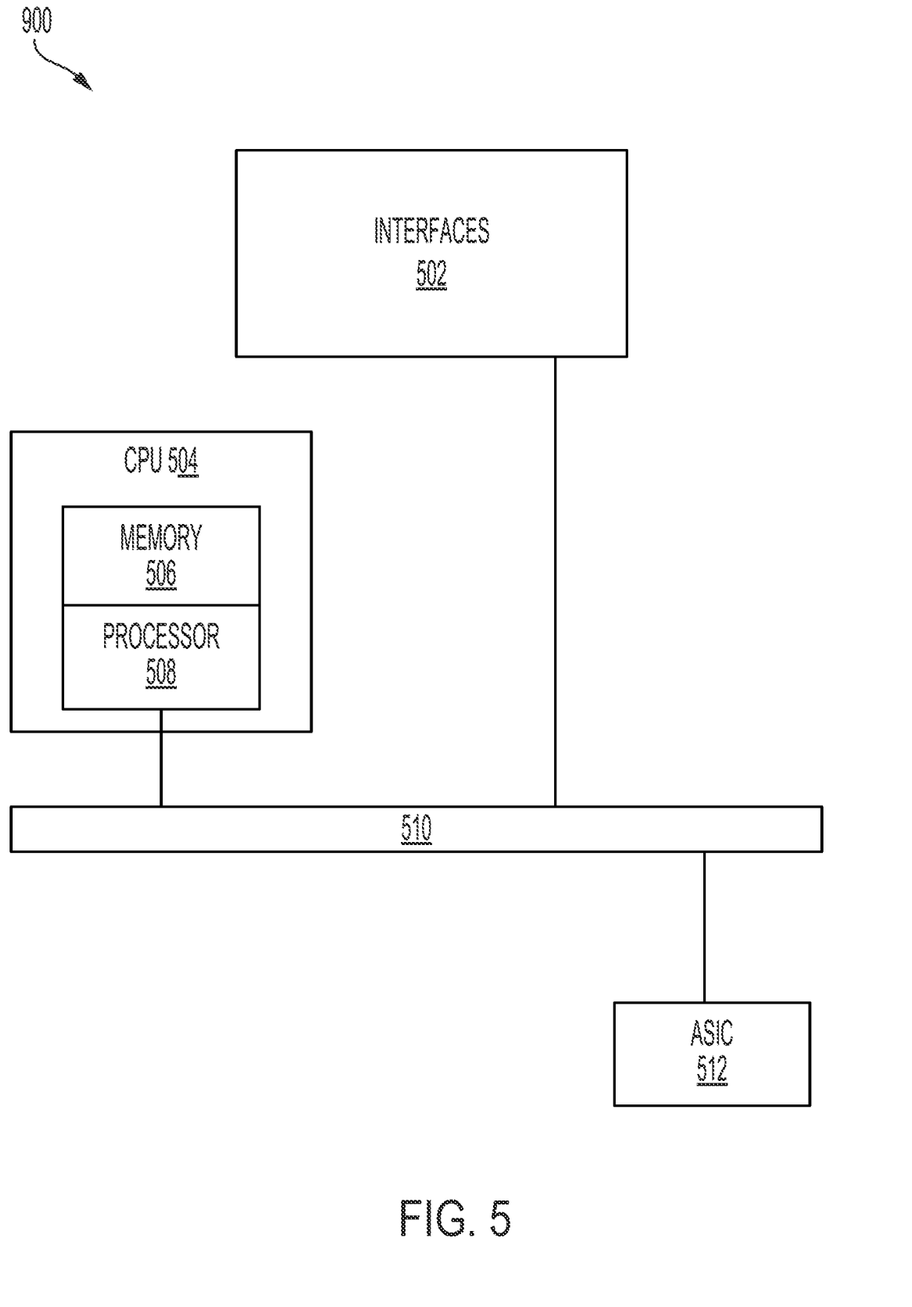
FIG. 5 illustrates an example network device suitable for performing switching, routing, and other networking operations in accordance with some embodiments.
Figure 6:
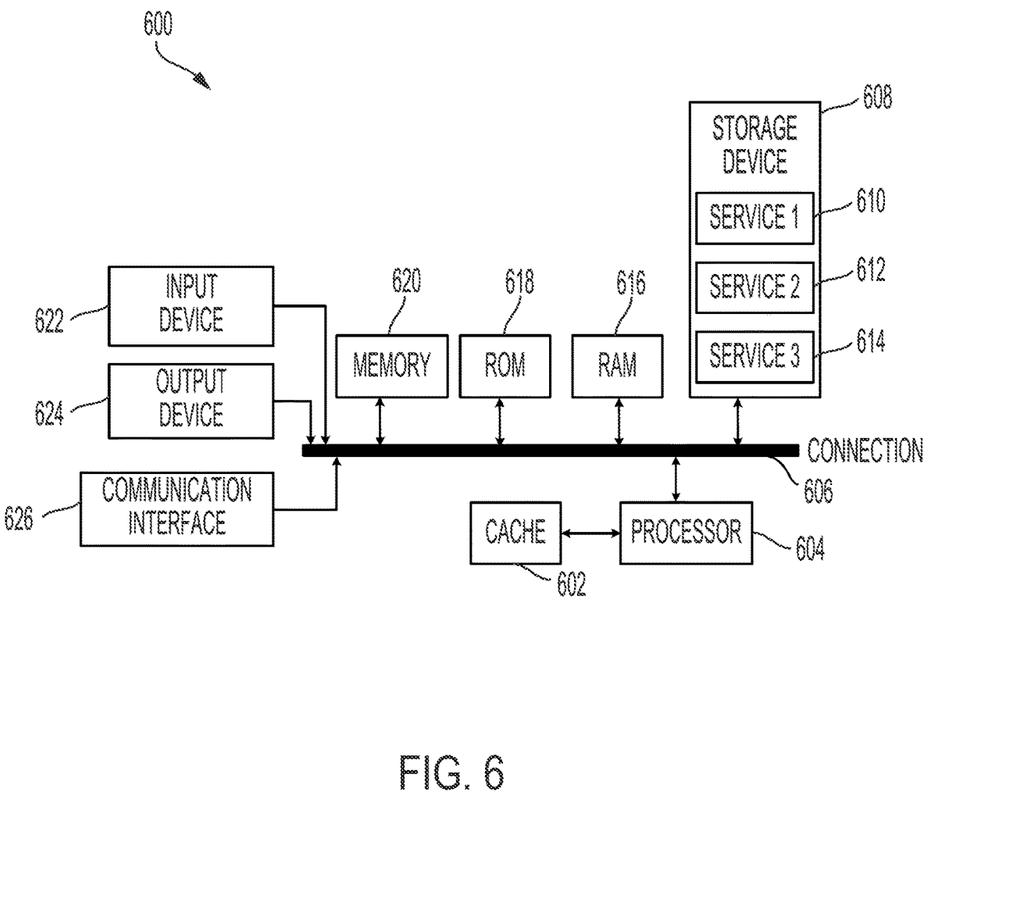
FIG. 6 illustrates a computing system architecture including various components in electrical communication with each other using a connection in accordance with some embodiments.

Disclosed herein are systems, methods and computer-readable storage media for forwarding intra-VLAN multicast traffic within an L2 fabric through L2 tunnel router devices within the L2 fabric without having to forward the intra-VLAN multicast traffic through L3 gateway devices. The present technologies will be described in more detail in the following disclosure as follows. The discussion begins with a detailed description of example systems, processes and environments for moving the multicast forwarding functionality of the L2 fabric away from L3 gateways to L2 tunnel router devices hosting multicast sources within the L2 fabric, as illustrated in FIGS. 1 through 4. The discussion concludes with a description of an example network and computing devices, as illustrated in FIGS. 5 and 6.

Figure 1:
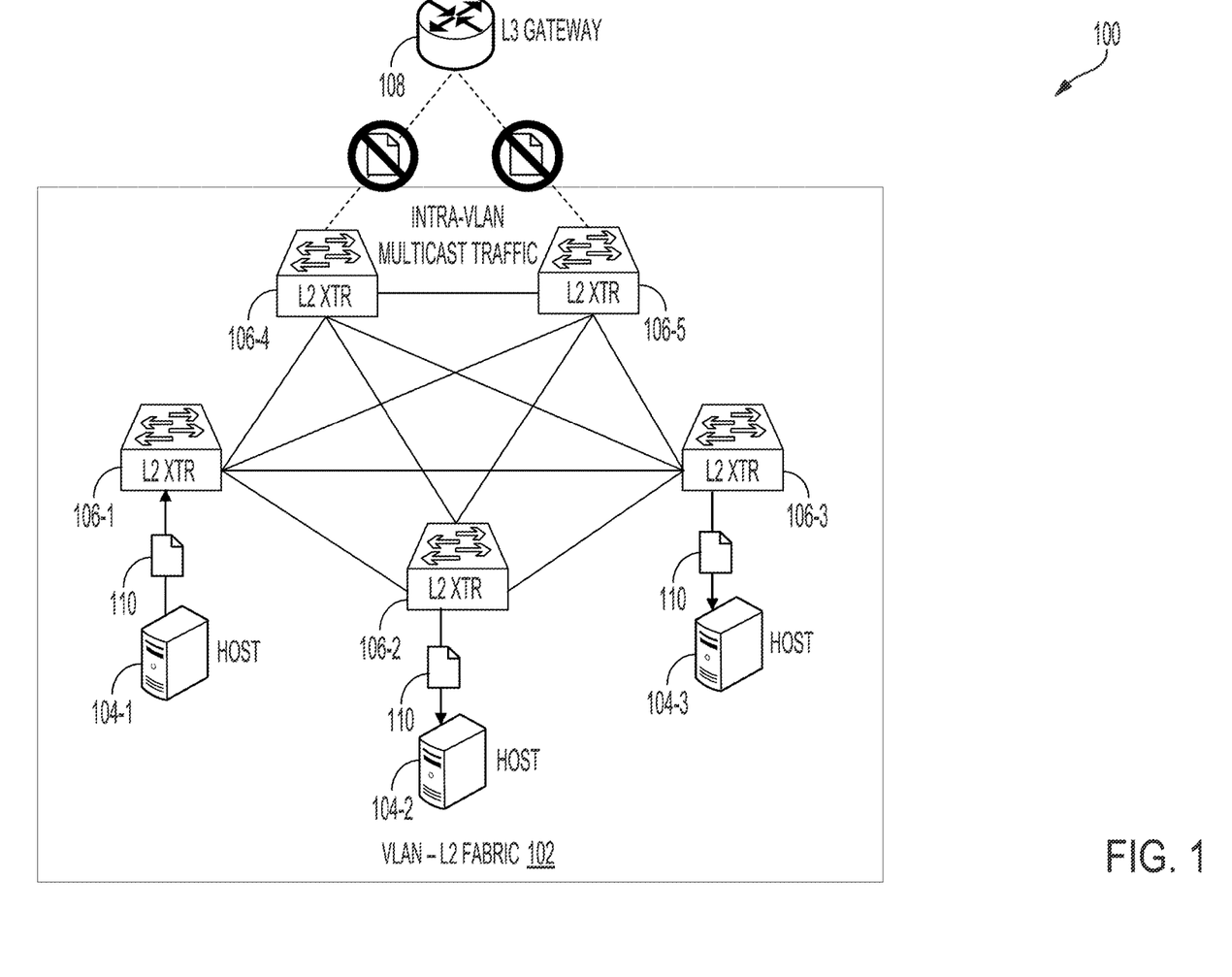
FIG. 1 shows an illustrative example of an environment in which intra-virtual local area network (VLAN) network traffic within an L2 fabric is transmitted to other devices within the L2 fabric without forwarding the intra-VLAN network traffic through an L3 gateway in accordance with at least one embodiment.

FIG. 1 shows an illustrative example of an environment 100 in which intra-VLAN network traffic within an L2 fabric 102 is transmitted to other devices within the L2 fabric 102 without forwarding the intra-VLAN network traffic through an L3 gateway 108 in accordance with at least one embodiment. In the environment 100, an underlay network is defined by a set of network elements (e.g., hosts 104-1-104-3, L2 tunnel router devices 106-1-106-5, etc.) that are used to deploy an SDA network. These network elements, in an embodiment, establish Internet Protocol (IP) connectivity through use of a routing protocol. In some instances, the underlay network may rely on an L3 foundation, through which L3 forwarding in the core and distribution layers of the underlay network is leveraged for distribution of network traffic through the set of network elements within the underlay network.

In an embodiment, an L2 fabric 102 is implemented to create a logical topology that is used to virtually connect the L2 tunnel router devices 106-1-106-5 to generate a full mesh connection amongst these L2 tunnel router devices 106-1-106-5. This logical topology may be generated over the physical underlay network topology described above through virtualization. The data plane traffic and control plane signaling may be contained within each virtualized network in order to maintain independents from the underlay network. Through SDA. L2 and L3 connectivity across the overlay network is extended through services provided through Locator/ID Separation Protocol (LISP).

In an embodiment, the multicast forwarding functionality in the L2 fabric 102 is moved away from the L3 gateway 108 within the network to the L2 tunnel router devices 106-1-106-5 that hosts multicast sources within the L2 fabric 102. To move the multicast forwarding functionality away from the L3 gateway 108 to the L2 tunnel router devices 106-1-106-5, the L2 multicast state within the L2 fabric 102 may be built across the LISP routing locators (RLOCs) in the L2 fabric 102 without relying on the L3 gateway 108. For instance, intra-VLAN multicast traffic within the L2 fabric 102 is facilitated through L2 BUM underlay multicast trees, the L2 BUM underlay multicast trees may be leveraged to achieve initial multicast traffic flow convergence for any-source multicast (ASM) within the SDA network.

In the environment 100, a network host 104-1 transmits a data packet 110 within the broadcast domain of the L2 fabric 102. The data packet 110 is transmitted on the L2 BUM group as configured within the L2 fabric 102 through the L2 tunnel router device 106-1 associated with the network host 104-1 to the other L2 tunnel router devices 106-2-106-5 within the L2 fabric 102. Through these other L2 tunnel router devices 106-2-106-5, the data packet 102 may be received by other hosts 104-2-104-3 within the L2 fabric 102. For instance, as illustrated in FIG. 1, through transmission of the data packet 110 on the L2 BUM group within the L2 fabric 102, the L2 tunnel router device 106-2 may transmit the data packet 110 to host 104-2 and the L2 tunnel router device 106-3 may transmit the data packet 110 to host 104-3. However, since the data packet 110 is transmitted over the broadcast domain of the L2 fabric 102, where the L3 gateway 108 is not required, the L3 gateway 108 may be excluded resulting in the data packet 110 being forwarded to the other L2 tunnel router devices 106-2-106-5 without having the data packet 110 forwarded through the L3 gateway 108.

In an embodiment, when an L2 multicast last hop device (e.g., an L2 tunnel router device connected to a multicast receiver within the L2 fabric 102), the L2 multicast last hop device automatically determines a new underlay multicast tree that is rooted at the L2 multicast first hop device (e.g., an L2 tunnel router device connected to the multicast source within the L2 fabric 102). For instance, as illustrated in FIG. 1, L2 tunnel router devices 106-2 and 106-3 may serve as L2 multicast last hop devices within the L2 fabric 102, as these L2 tunnel router devices 106-2 and 106-4 are connected to hosts 104-2 and 104-3, respectively, which serve as multicast receivers within the L2 fabric 102. Accordingly, L2 tunnel router devices 106-2 and 106-3, in response to receiving the data packet 110 through the L2 BUM, may automatically determine new underlay multicast trees rooted at the L2 tunnel router device 106-1 connected to network host 104-1, as the network host 104-1 is the multicast source for data packet 110.

In an embodiment, the underlay multicast tree selection can be performed through any available mechanism. For example, the underlay multicast tree selection may be performed using protocol independent multicast-source specific multicast (PIM-SSM), through which an optimal path between the multicast source and the receiver may be created without the need to meet at a centralized point such as the L3 gateway 108. In some instances, the underlay tree selection may be performed through any available hash-based mechanism, such as the hash-based mechanism implemented through SDA. Alternatively, the underlay tree selection may be performed through a signal-free mechanism, such as the signal-free mechanism described in the Internet Engineering Task Force (IETF) Request for Comments (RFC) 8378, which is hereby incorporated in its entirety into the present disclosure by reference.

In an embodiment, periodic data packets may be transmitted within the L2 BUM group to indicate the presence of the multicast source in the L2 fabric 102. These periodic data packets may be configured such that the L2 tunnel router devices currently within the L2 BUM group (e.g., L2 tunnel router devices 106-1-106-5) and the network hosts (e.g., network hosts 104-1-104-3) do not consume these data packets. However, a late receiver added to the L2 fabric 102 may consume the period data packet to detect the presence of the L2 BUM group and determine whether to submit an Internet Group Management Protocol (IGMP) join request for joining the L2 BUM group in order to receive any multicast traffic associated with the L2 BUM group. In an embodiment, the periodic data packets transmitted within the L2 BUM group has empty payload to reduce the required bandwidth for transmission of these periodic data packets.

In an embodiment, the L3 gateway 108 is configured to forward network traffic from sources outside of the VLAN (e.g., L2 fabric 102) to the network hosts 104-1-104-3 through the L2 tunnel router devices 106-1-106-5 within the L2 fabric 102. Additionally, if a data packet from a particular multicast source (e.g., network host) is destined for receivers outside of the VLAN, the corresponding L2 multicast last hop devices may forward the data packet to the L3 gateway 108, which may forward this data packet to the particular receivers outside of the VLAN. In some instances, any (*,G) IGMP join requests received on the different L2 multicast last hop devices may also be forwarded to the L3 gateway 108. However, any (S,G) IGMP join requests corresponding to multicast sources within the L2 fabric 102 may be considered intra-VLAN network traffic. Thus, any received (S,G) IGMP join requests may be processed without forwarding the join requests to the L3 gateway 108.

In an embodiment, the L2 egress tunnel routers (ETRs) within the L2 fabric 102 can cross-verify the MAC/IP information learned from the L2 LISP control plane with that of the L2 virtual network identifier (L2VNI), overlay MAC, and underlay multicast source IP address of the data packet received via the L2 BUM group to avoid loops. For instance, within the L2 fabric 102, an L2 first hop tunnel router device (e.g., tunnel router device 104-1, as illustrated in FIG. 1) may stream the data packet 110 to the LISP interface only if the multicast source MAC address is local to the L2 fabric 102. Through this process, the L2 ETRs may perform reverse-path forwarding (RPF) checks to ensure that routing loops are avoided for the data packet 110 that is to be multicast within the L2 fabric 102.

In an embodiment, the L2 fabric 102 includes one or more constrained devices whose main function may not be network data packet processing within the VLAN. The one or more constrained devices may include different Internet-of-Things (IoT) devices. These IoT devices may not have secure storage capabilities or the compute capabilities required to enable use of different capabilities available to other devices. For instance, a constrained device 102 may operate under various resource constraints such as limited battery and compute capabilities, limited memory capacity, and limited communications bandwidth and ability to communicate with other devices and systems. The limited capabilities and resources associated with a constrained device may be defined based on any cost and/or physical constraints on characteristics of the constrained device. For instance, constrained devices may need to be implemented in environments where the size and weight of the constrained devices is to be minimized. Further, these constrained devices may need to be implemented in environments where there are constraints on the amount of available power and energy. These IoT devices may be end nodes within the L2 fabric 102 that include sensors and/or actuators that are implemented for a particular purpose. Given these limited capabilities and resource constraints, the configuration of the L2 fabric 102 to provide selective multicast flooding by moving the multicast forwarding functionality in the L2 fabric 102 away from the L3 gateway 108 to the L2 tunnel router devices hosting multicast sources within the L2 fabric 102 may reduce the likelihood of these IoT devices within the L2 fabric 102 being overburdened by large-sized and/or high-rate multicast data packets.

Figure 2:
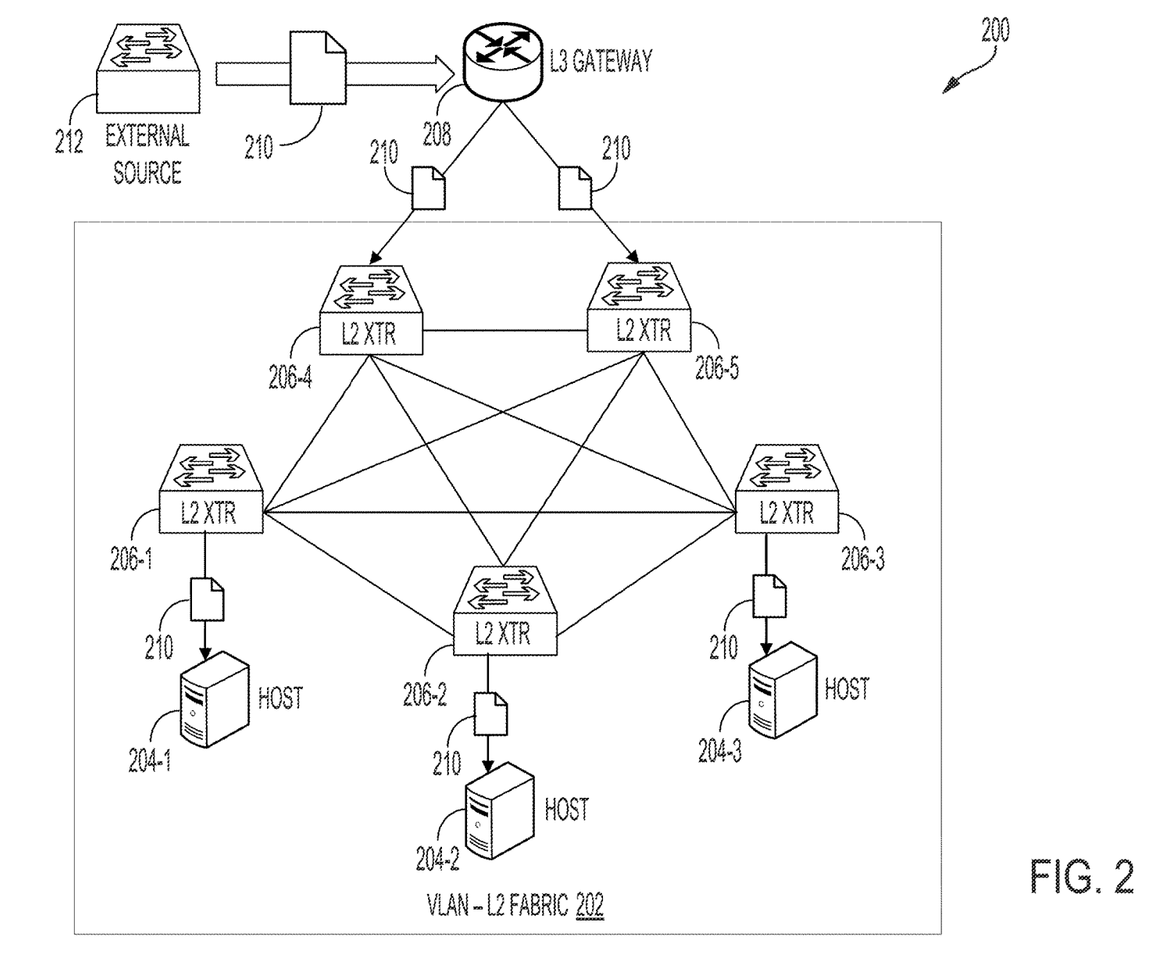
FIG. 2 shows an illustrative example of an environment in which an L3 gateway forwards network traffic from sources outside of the L2 fabric to other devices within the L2 fabric in accordance with at least one embodiment.

FIG. 2 shows an illustrative example of an environment 200 in which an L3 gateway 208 forwards network traffic from sources outside of the L2 fabric 202 to other devices within the L2 fabric 202 in accordance with at least one embodiment. In the environment 200, the L2 fabric 202 is an underlay network that is defined by the L2 tunnel router devices 206-1-206-5 and corresponding network hosts 204-1-204-3. However, it should be noted that the L2 fabric 202 may include any number of L2 tunnel router devices and network hosts as configured by a network administrator or other entity for the virtualized underlay network. Similar to the L2 fabric 102 described above in connection with FIG. 1, the aforementioned network elements may establish IP connectivity through use of a routing protocol. The underlay network may rely on an L3 foundation, through which L3 forwarding in the core and distribution layers of the underlay network is leveraged for distribution of network traffic through the set of network elements within the underlay network.

As noted above, the multicast forwarding functionality in the L2 fabric 202 is moved away from the L3 gateway 208 within the network to the L2 tunnel router devices 206-1-206-5 that host multicast sources within the L2 fabric 202. To accomplish this, the L2 multicast state within the L2 fabric 202 may be built across the LISP RLOCs in the L2 fabric 202 without relying on the L3 gateway 208. Once the L2 multicast state within the L2 fabric 202 has been built, data packets transmitted over the broadcast domain of the L2 fabric 202 are forwarded to the other L2 tunnel router devices without having the data packet forwarded through the L3 gateway 208.

In an embodiment, the L3 gateway 208 is a border node in relation to the L2 fabric 202 that serves as the gateway between the SDA fabric site (e.g., the L2 fabric 202) and the networks external to the L2 fabric 202. The L3 gateway 208 may thus serve as the gateway of last resort for the L2 fabric edge nodes. In some instances, the L3 gateway 208 can extend network virtualization from inside the L2 fabric 202 to outside the L2 fabric 202 by using virtual routing and forwarding (VRF)-lite and VRF-aware routing protocols to preserve segmentation. Additionally, the L3 gateway 208 may map Security Group Tag (SGT) information from within the L2 fabric 202 to be appropriately maintained when exiting the L2 fabric 202. When a data packet from the L2 fabric 202 destined for an external receiver is de-encapsulated at the L3 gateway 208, SGT information can be propagated using SGT Exchange Protocol (SXP) or by directly mapping SGTs into the metadata field in a data packet using inline tagging.

In some instances, data packets and frames received from outside of the L2 fabric 202 and destined for an endpoint inside of the L2 fabric 202 (e.g., any of network hosts 204-1-204-3, etc.) are encapsulated in the L2 fabric Virtual Extensible LAN (VXLAN) by the L3 gateway 208. Further, any data packets and frames sourced from inside of the L2 fabric 202 and destined for a receiver outside of the L2 fabric 202 are de-encapsulated by the L3 gateway 208. This may allow the L3 gateway 208 to connect the L2 fabric 202 to a non-fabric network or other external network. However, as noted above, the L2 fabric 202 is configured such that data packets and frames sourced from inside of the L2 fabric 202 and destined for a receiver within the L2 fabric 202 (e.g., intra-VLAN network traffic in the broadcast domain, etc.) are transmitted within the L2 fabric 202 without having this network traffic forwarded through the L3 gateway 208.

In the environment 200, the L3 gateway 208 receives a data packet 210 from some external source 212. The external source 212 may include a switch, router, or other device associated with an external network, such as the Internet or other portion of the overall network (e.g., a different L2 fabric within the overall network, etc.) that the L2 fabric 202 is a part of. The data packet 210 may be destined for one or more network hosts 204-1-204-3 within the L2 fabric 202. Alternatively, the data packet 210 may be destined for the L2 fabric 202 itself, whereby the data packet 210 is to be distributed to the various network hosts 204-1-204-3 within the L2 fabric 202 through multicast. In response to receiving the data packet 210, the L3 gateway 208 may encapsulate the data packet 210 in the L2 fabric VXLAN, as described above.

In some instances, the L3 gateway 208 may perform head-end replication of the data packet 210, whereby the data packet 210 is replicated and sent, via unicast, by the L3 gateway 208 to all L2 fabric last hop routers connected to interested subscribers (e.g., network hosts 204-1-204-3). Alternatively, in some instances, the data packet 210 may be encapsulated in multicast in the underlay using PIM-ASM or PIM-SSM to allow the L2 fabric tunnel router devices 206-1-206-5 to perform replication of the data packet 210 within the full mesh to deliver the data packet 210 to the network hosts 204-1-204-3 connected to the LHRs within the L2 fabric 202.

In an embodiment, for data packets originating from an external source 212 and that are to be multicast to the network hosts 204-1-204-3 within the L2 fabric 202, the L3 gateway 208 serves as a rendezvous point (RP) in the PIM-ASM routing architecture. The L3 gateway 208, serving as the RP, may be the root for the multicast distribution tree within the L2 fabric 202 for distribution of the data packet 210 to the network hosts 204-1-204-3. The L2 fabric tunnel router devices with interested multicast receivers (e.g., L2 fabric tunnel router devices 206-1-206-3 associated with network hosts 204-1-204-3, respectively) may join this multicast distribution tree at the L3 gateway 208 to receive the data packet 210 from the external source 212. The multicast source of the data packet 210 (e.g., external source 212, a network element associated with external source 212, etc.) may be registered with the L3 gateway 208 to allow for multicast distribution of the data packet 210 within the L2 fabric 202, as illustrated in FIG. 2.

In an embodiment, the L3 gateway 208 further forwards any network traffic originating within the L2 fabric 202 to receivers outside of the VLAN. As an illustrative example, if a data packet from network host 204-1 (serving as a multicast source) is destined for receivers outside of the VLAN, the corresponding L2 multicast last hop devices may forward the data packet to the L3 gateway 208, which may forward this data packet to the particular receivers outside of the VLAN. Additionally, the L3 gateway 208 may receive any new (*,G) IGMP join requests received on the different L2 multicast last hop devices. For instance, if an L2 multicast last hop device receives a new (*,G) IGMP join request from a network host interested in subscribing to a multicast, the L2 multicast last hop device may forward this (*,G) IGMP join request to the L3 gateway 208.

As noted above, the L3 gateway 208 may be excluded from being forwarded any intra-VLAN traffic within the L2 fabric 202, where the multicast source and the intended receivers are all within the L2 fabric 202. For instance, any (S,G) IGMP join requests (where "S" denotes a multicast source within the L2 fabric 202) would be considered intra-VLAN traffic and thus would not be forwarded to the L3 gateway 208. Further, for any L2 multicast traffic within the L2 fabric 202, the L2 multicast state may be constructed on all the L2 tunnel router devices 206-1-206-5 without having this multicast traffic being forwarded through the L3 gateway 208. Further, in some embodiments, if the L2 fabric 202 is defined such that all multicast traffic is within the broadcast domain, the L3 gateway 208 can be completely excluded from the network topology. This may simplify the SDA deployment of the L2 fabric 202.

Figure 3:
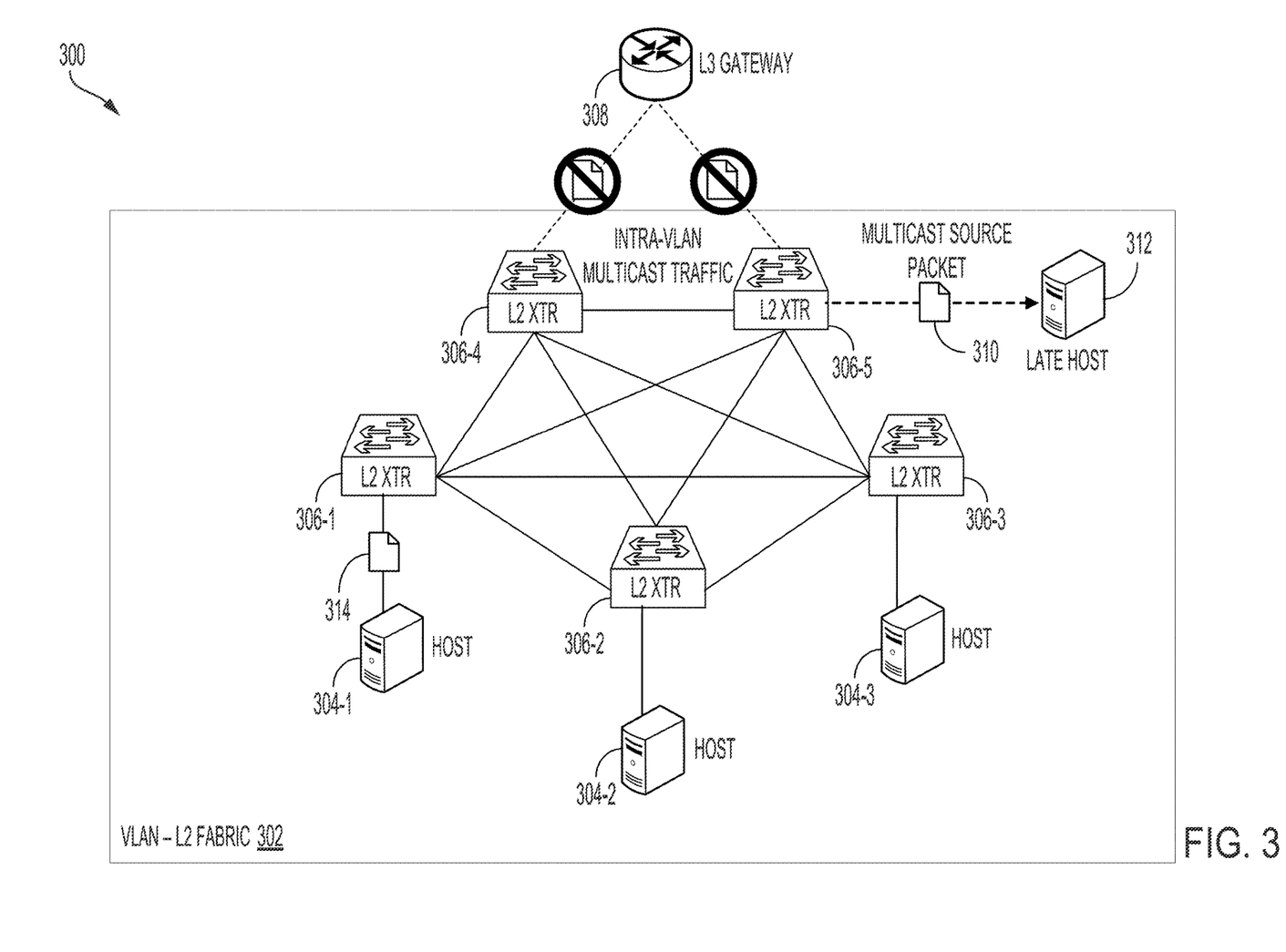
FIG. 3 shows an illustrative example of an environment in which periodic data packets are transmitted on the L2 broadcast, unknown-multicast and multicast (BUM) group within the L2 fabric to indicate the presence of a multicast source within the L2 fabric to allow for late receiver convergence in accordance with at least one embodiment.

FIG. 3 shows an illustrative example of an environment 300 in which periodic data packets 310 are transmitted on the L2 fabric broadcast, unknown-multicast and multicast (BUM) group within the L2 fabric 302 to indicate the presence of a multicast source within the L2 fabric 302 to allow for late receiver convergence in accordance with at least one embodiment. The environment 300 may be similar to the environments 100 and 200 described above in connection with FIGS. 1 and 2, respectively. For instance, the L2 fabric 302 may be an underlay network that is defined by the L2 tunnel router devices 306-1-306-5 and corresponding network hosts 304-1-304-3. However, the L2 fabric 302 may be configured to include any number of L2 tunnel router devices and network hosts as configured by a network administrator or other entity for the virtualized underlay network. Similar to the L2 fabrics 102 and 202 described above in connection with FIGS. 1 and 2, respectively, the aforementioned network elements may establish IP connectivity through use of a routing protocol. Further, L3 forwarding in the core and distribution layers of the underlay network of the L2 fabric 302 is leveraged for distribution of network traffic through the set of network elements within the underlay network.

As noted above, when the last hop L2 tunnel router devices within the L2 fabric 302 receive a multicast data packet 314 from a multicast source (e.g., network host 304-1) in the L2 BUM, these last hop L2 tunnel router devices may automatically determine a new underlay multicast tree rooted at the L2 multicast first hop. This underlay tree selection may be performed via any available mechanism (e.g., hash-based mechanisms, signal-free mechanisms, etc.). Through this underlay multicast tree, the multicast forwarding state for the L2 fabric 302 and the multicast data packet 314 can be determined.

In an embodiment, periodic data packets 310 are transmitted within the L2 BUM group to indicate the presence of a multicast source in the L2 fabric 302. For example, as illustrated in FIG. 3, network host 304-1 is a multicast source within the L2 fabric 302, transmitting a data packet 314 to other receivers (e.g., network hosts 304-2 and 304-3) within the L2 fabric 302. As noted above, the L2 fabric 302 is configured such that data packets and frames sourced from inside of the L2 fabric 302 and destined for receivers within the L2 fabric 302 (e.g., intra-VLAN network traffic in the broadcast domain, etc.) are transmitted within the L2 fabric 302 without having this network traffic forwarded through the L3 gateway 308. Thus, the data packet 314 from the network host 304-1 can be considered intra-VLAN network traffic, which is distributed within the L2 BUM group through the full mesh established amongst the different L2 tunnel router devices 306-1-306-5 through multicast without forwarding the data packet 314 to the L3 gateway 308.

The periodic data packets 310 indicating the presence of the multicast source (e.g., network host 304-1) and of distribution of the data packet 314 may be configured such that the L2 tunnel router devices currently within the L2 BUM group (e.g., L2 tunnel router devices 306-1-306-5) and the network hosts (e.g., network hosts 304-1-304-3) do not consume these data packets 310. These periodic data packets 310 may have an empty payload to reduce the required bandwidth for transmission of the periodic data packets 310. Further, as the periodic data packets 310 may denote the multicast source within the L2 fabric 302 for the intra-VLAN multicast, the L2 tunnel router devices and network hosts within the L2 fabric 302 may automatically disregard these periodic data packets 310, as the L2 tunnel router devices and the network hosts may already be subscribed to the multicast source within the L2 BUM group.

In an embodiment, when a late receiver (e.g., late network host 312) is added to the L2 fabric 302, the late receiver may consume the periodic data packet 310 to detect the presence of the L2 BUM group and determine whether to submit an IGMP join request for joining the L2 BUM group. As noted above, the periodic data packet 310 may uniquely identify the multicast source within the L2 fabric 302 for the data packet 314 being transmitted within the L2 fabric 302 as intra-VLAN traffic. Accordingly, in response to receiving the periodic data packet 310 indicating the multicast source for data packet 314, the late receiver may submit an (S,G) IGMP join request to join the L2 BUM group corresponding to the multicast source (e.g., network host 304-1, as illustrated in FIG. 3). Since the (S,G) IGMP join request refers to the unicast IP address of the multicast source within the L2 fabric 302, the (S,G) IGMP join request may be considered as intra-VLAN traffic within the L2 fabric 302. Thus, the (S,G) IGMP join request may be processed within the L2 fabric 302 without having to forward the (S,G) IGMP join request to the L3 gateway 308.

As noted above, any (*,G) IGMP join requests received on the different L2 last hop tunnel router devices may still be forwarded to the L3 gateway 308. As these IGMP join requests may correspond to any multicast source for which data packets are multicast to the particular L2 BUM group specified in the join requests (e.g., "G" denotes the IP address of the multicast group that the receiver is subscribing to), including multicast sources outside of the L2 fabric 302, (*,G) IGMP join requests may not be inherently considered to be intra-VLAN traffic. Accordingly, such IGMP join requests are automatically forwarded to the L3 gateway 308.

Figure 4:
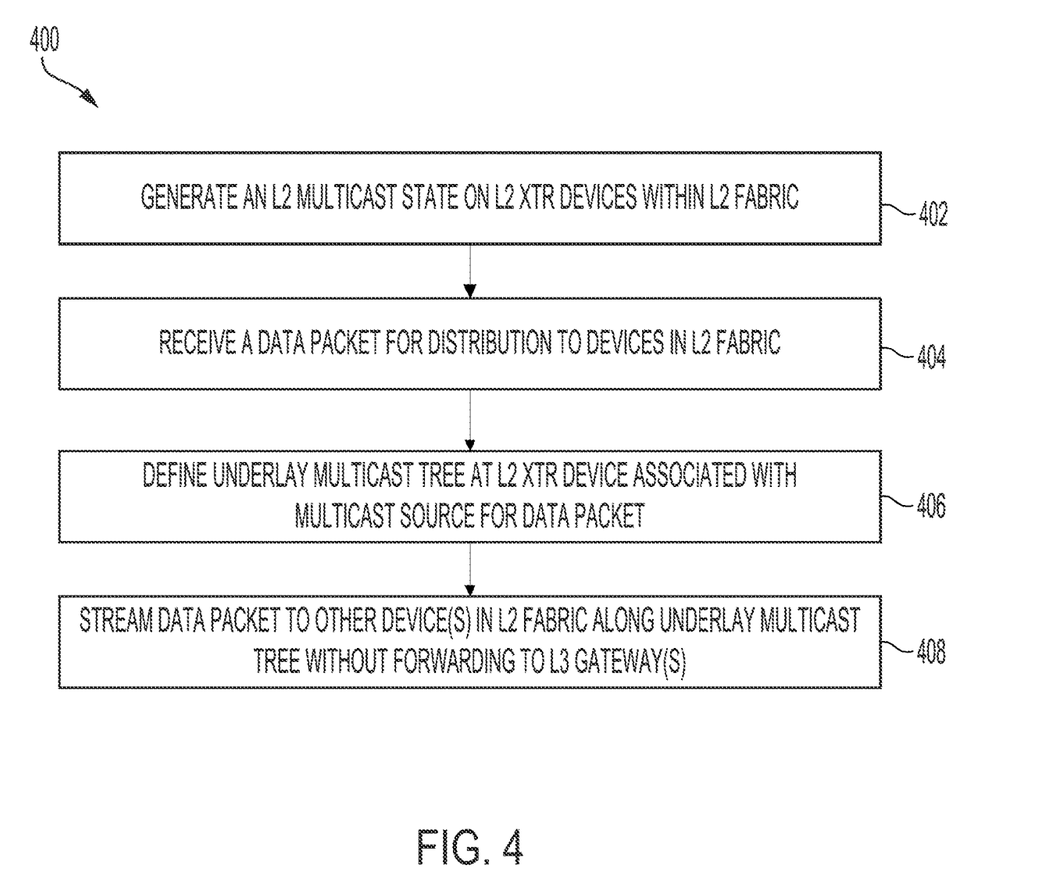
FIG. 4 shows an illustrative example of a process for streaming intra-VLAN traffic to devices within an L2 fabric without forwarding the data packet to L3 gateways in accordance with at least one embodiment.

FIG. 4 shows an illustrative example of a process 400 for streaming intra-VLAN traffic to devices within an L2 fabric without forwarding the data packet to L3 gateways in accordance with at least one embodiment. The process 400 may be performed within SDA network architectures, through which multicast flooding of data packets within L2 fabrics for selective multicast inside the broadcast domain. In some examples, the process 400 may be performed with deployed PIM designated router (DR) election mechanisms when the L2 subnet spans multiple fabric edges/sites. Further, the process 400 may be performed by reusing existing IGMP constructs.

At step 402, an L2 multicast state is generated on the L2 tunnel router devices within the L2 fabric. The L2 multicast state may be generated across the LISP RLOCs in the L2 fabric without relying on the L3 gateway, as described above. As noted above, intra-VLAN multicast traffic within the L2 fabric is facilitated through L2 BUM underlay multicast trees. These L2 BUM underlay multicast trees may be leveraged to achieve initial multicast traffic flow convergence for ASM within the SDA network.

At step 404, a data packet is received for distribution to other devices within the L2 fabric. For instance, a network host within the L2 fabric transmits a data packet within the broadcast domain of the L2 fabric. The data packet is transmitted on the L2 BUM group through an L2 tunnel router device associated with the network host to the other L2 tunnel router devices within the L2 fabric. As a result of the data packet being transmitted over the broadcast domain of the L2 fabric, the L3 gateway may be excluded. This may cause the data packet to be forwarded to the other L2 tunnel router devices within the L2 fabric without having the data packet forwarded through the L3 gateway.

At step 406, the underlay multicast tree may be defined at the L2 tunnel router device associated with the multicast source for the data packet. For instance, when an L2 multicast last hop device (e.g., an L2 tunnel router device connected to a multicast receiver within the L2 fabric), the L2 multicast last hop device automatically determines a new underlay multicast trec that is rooted at the L2 multicast first hop device (e.g., the L2 tunnel router device connected to the multicast source within the L2 fabric). This underlay multicast tree selection may be performed via any available mechanism (e.g., hash-based mechanisms, signal-free mechanisms, etc.).

At step 408, the data packet may be streamed to the other devices in the L2 fabric along the underlay multicast tree without forwarding the data packet to any L3 gateways. The L3 gateways, as described above, may forward any data packets originating from an external source and that are to be multicast to the network hosts within the L2 fabric. Additionally, the L3 gateways may forward data packets destined for receivers outside of the L2 fabric. For instance, if a data packet from a particular multicast source within the L2 fabric is destined for receivers outside of the L2 fabric, the corresponding L2 multicast last hop devices may forward this data packet to an L3 gateway, which may forward this data packet to the receivers outside of the L2 fabric. Further, any (*,G) IGMP join requests received on the different L2 multicast last hop devices may also be forwarded to L3 gateways. However, since the data packet is to be distributed to other devices within the L2 fabric, the data packet is not forwarded to the L3 gateways for distribution to these other devices.

FIG. 5 illustrates an example network device 500 suitable for performing switching, routing, and other networking operations in accordance with some implementations. Network device 500 includes a CPU 504, interfaces 502, and a connection 510 (e.g., a Peripheral Component Interconnect (PCI) bus). When acting under the control of appropriate software or firmware, the CPU 504 is responsible for executing packet management, error detection, and/or routing functions. The CPU 504 can accomplish these functions under the control of software including an operating system and any appropriate applications software. The CPU 504 may include one or more processors 508, such as a processor from the Intel® X98 family of microprocessors. In some cases, the processor 508 can be specially designed hardware for controlling the operations of network device 500. In some cases, a memory 506 (e.g., non-volatile RAM, ROM, etc.) also forms part of the CPU 504. However, there are many different ways in which memory could be coupled to the system.

The interfaces 502 are typically provided as modular interface cards (sometimes referred to as "line cards"). Generally, they control the sending and receiving of data packets over the network and sometimes support other peripherals used with the network device 500. Among the interfaces that may be provided are Ethernet interfaces, frame relay interfaces, cable interfaces, Digital Subscriber Line (DSL) interfaces, token ring interfaces, and the like. In addition, various very high-speed interfaces may be provided such as fast token ring interfaces, wireless interfaces, Ethernet interfaces, Gigabit Ethernet interfaces, Asynchronous Transfer Mode (ATM) interfaces, High-Speed Serial Interface (HSSI) interfaces, Packet Over SONET/SDH (POS) interfaces, Fiber Distributed Data Interface (FDDI) interfaces, WiFi interfaces, 3G/4G/5G cellular interfaces, Controller Area Network (CAN) bus, Long Range (LoRa), and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 504 to efficiently perform routing computations, network diagnostics, security functions, etc.

Although the system shown in FIG. 5 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 500.

Regardless of the network device's configuration, it may employ one or more memories or memory modules (including memory 506) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 506 could also hold various software containers and virtualized execution environments and data.

The network device 500 can also include an application-specific integrated circuit (ASIC) 512, which can be configured to perform routing and/or switching operations. The ASIC 512 can communicate with other components in the network device 500 via the connection 510, to exchange data and signals and coordinate various types of operations by the network device 500, such as routing, switching, and/or data storage operations, for example.

FIG. 6 illustrates a computing system architecture 600 including various components in electrical communication with each other using a connection 606, such as a bus, in accordance with some implementations. Example system architecture 600 includes a processing unit (CPU or processor) 604 and a system connection 606 that couples various system components including the system memory 620, such as ROM 618 and RAM 616, to the processor 604. The system architecture 600 can include a cache 602 of high-speed memory connected directly with, in close proximity to, or integrated as part of the processor 604. The system architecture 600 can copy data from the memory 620 and/or the storage device 608 to the cache 602 for quick access by the processor 604. In this way, the cache can provide a performance boost that avoids processor 604 delays while waiting for data. These and other modules can control or be configured to control the processor 604 to perform various actions.

Other system memory 620 may be available for use as well. The memory 620 can include multiple different types of memory with different performance characteristics. The processor 604 can include any general purpose processor and a hardware or software service, such as service 1 610, service 2 612, and service 3 614 stored in storage device 608, configured to control the processor 604 as well as a special-purpose processor where software instructions are incorporated into the actual processor design. The processor 604 may be a completely self-contained computing system, containing multiple cores or processors, a bus, memory controller, cache, etc. A multi-core processor may be symmetric or asymmetric.

To enable user interaction with the computing system architecture 600, an input device 622 can represent any number of input mechanisms, such as a microphone for speech, a touch-sensitive screen for gesture or graphical input, keyboard, mouse, motion input, speech and so forth. An output device 624 can also be one or more of a number of output mechanisms known to those of skill in the art. In some instances, multimodal systems can enable a user to provide multiple types of input to communicate with the computing system architecture 600. The communications interface 626 can generally govern and manage the user input and system output. There is no restriction on operating on any particular hardware arrangement and therefore the basic features here may easily be substituted for improved hardware or firmware arrangements as they are developed.

Storage device 608 is a non-volatile memory and can be a hard disk or other types of computer readable media which can store data that are accessible by a computer, such as magnetic cassettes, flash memory cards, solid state memory devices, digital versatile disks, cartridges, RAMs 616, ROM 618, and hybrids thereof.

The storage device 608 can include services 610, 612, 614 for controlling the processor 604. Other hardware or software modules are contemplated. The storage device 608 can be connected to the system connection 606. In one aspect, a hardware module that performs a particular function can include the software component stored in a computer-readable medium in connection with the necessary hardware components, such as the processor 604, connection 606, output device 624, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

The invention claimed is:

1. A computer-implemented method comprising:
generating a multicast state within a Layer 2 (L2) fabric, wherein the multicast state is generated in a set of L2 tunnel router devices within the L2 fabric, and wherein the multicast state is established without forwarding multicast traffic through Layer 3 (L3) gateways;
receiving a data packet, wherein the data packet is received for distribution to other devices in the L2 fabric;
defining an underlay multicast tree, wherein the underlay multicast tree is defined at an L2 tunnel router device from the set of L2 tunnel router devices, and wherein the L2 tunnel router device serves as a multicast source for the data packet; and streaming the data packet to the other devices in the L2 fabric, wherein the data packet is streamed through the L2 tunnel router device along the underlay multicast tree without forwarding the data packet through the L3 gateways.

2. The computer-implemented method of claim 1, wherein the data packet is streamed as broadcast, unknown-unicast and multicast (BUM) traffic within the L2 fabric.

3. The computer-implemented method of claim 1, further comprising:

receiving a (S,G) Internet Group Management Protocol (IGMP) join request, wherein the (S,G) IGMP join request corresponds to a multicast source within the L2 fabric; and processing the (S,G) IGMP join request within the L2 fabric without forwarding the (S,G) IGMP join request to the L3 gateways.

4. The computer-implemented method of claim 1, wherein network traffic from sources outside of the L2 fabric are forwarded to other devices in the L2 fabric through the L3 gateways.

5. The computer-implemented method of claim 1, further comprising:

transmitting periodic data packets within the L2 fabric without forwarding the periodic data packets through the L3 gateways, wherein the periodic data packets indicate the multicast source.

6. The computer-implemented method of claim 1, wherein the data packet is streamed to the other devices in the L2 fabric as a result of the data packet indicating a local Media Access Control (MAC) address corresponding to the multicast source.

7. The computer-implemented method of claim 1, wherein the other devices include a set of constrained devices.

8. A system, comprising:

one or more processors; and memory storing thereon instructions that, as a result of being executed by the one or more processors, cause the system to:

generate a multicast state within a Layer 2 (L2) fabric, wherein the multicast state is generated in a set of L2 tunnel router devices within the L2 fabric, and wherein the multicast state is established without forwarding multicast traffic through Layer 3 (L3) gateways;

receive a data packet, wherein the data packet is received for distribution to other devices in the L2 fabric;

define an underlay multicast tree, wherein the underlay multicast tree is defined at an L2 tunnel router device from the set of L2 tunnel router devices, and wherein the L2 tunnel router device serves as a multicast source for the data packet; and stream the data packet to the other devices in the L2 fabric, wherein the data packet is streamed through the L2 tunnel router device along the underlay multicast tree without forwarding the data packet through the L3 gateways.

9. The system of claim 8, wherein the data packet is streamed as broadcast, unknown-unicast and multicast (BUM) traffic within the L2 fabric.

10. The system of claim 8, wherein the instructions further cause the system to:

receive a (S,G) Internet Group Management Protocol (IGMP) join request, wherein the (S,G) IGMP join request corresponds to a multicast source within the L2 fabric; and process the (S,G) IGMP join request within the L2 fabric without forwarding the (S,G) IGMP join request to the L3 gateways.

11. The system of claim 8, wherein network traffic from sources outside of the L2 fabric are forwarded to other devices in the L2 fabric through the L3 gateways.

12. The system of claim 8, wherein the instructions further cause the system to:

transmit periodic data packets within the L2 fabric without forwarding the periodic data packets through the L3 gateways, wherein the periodic data packets indicate the multicast source.

13. The system of claim 8, wherein the data packet is streamed to the other devices in the L2 fabric as a result of the data packet indicating a local Media Access Control (MAC) address corresponding to the multicast source.

14. The system of claim 8, wherein the other devices include a set of constrained devices.

15. A non-transitory, computer-readable storage medium storing thereon executable instructions that, as a result of being executed by one or more processors of a computer system, cause the computer system to:

generate a multicast state within a Layer 2 (L2) fabric, wherein the multicast state is generated in a set of L2 tunnel router devices within the L2 fabric, and wherein the multicast state is established without forwarding multicast traffic through Layer 3 (L3) gateways;

receive a data packet, wherein the data packet is received for distribution to other devices in the L2 fabric;

define an underlay multicast tree, wherein the underlay multicast tree is defined at an L2 tunnel router device from the set of L2 tunnel router devices, and wherein the L2 tunnel router device serves as a multicast source for the data packet; and stream the data packet to the other devices in the L2 fabric, wherein the data packet is streamed through the L2 tunnel router device along the underlay multicast tree without forwarding the data packet through the L3 gateways.

16. The non-transitory, computer-readable storage medium of claim 15, wherein the data packet is streamed as broadcast, unknown-unicast and multicast (BUM) traffic within the L2 fabric.

17. The non-transitory, computer-readable storage medium of claim 15, wherein the executable instructions further cause the computer system to:

receive a (S,G) Internet Group Management Protocol (IGMP) join request, wherein the (S,G) IGMP join request corresponds to a multicast source within the L2 fabric; and process the (S,G) IGMP join request within the L2 fabric without forwarding the (S,G) IGMP join request to the L3 gateways.

18. The non-transitory, computer-readable storage medium of claim 15, wherein network traffic from sources outside of the L2 fabric are forwarded to other devices in the L2 fabric through the L3 gateways.

19. The non-transitory, computer-readable storage medium of claim 15, wherein the executable instructions further cause the computer system to:

transmit periodic data packets within the L2 fabric without forwarding the periodic data packets through the L3 gateways, wherein the periodic data packets indicate the multicast source.

20. The non-transitory, computer-readable storage medium of claim 15, wherein the data packet is streamed to the other devices in the L2 fabric as a result of the data packet indicating a local Media Access Control (MAC) address corresponding to the multicast source.

* * * * *